No. 817,569. PATENTED APR. 10, 1906.
H. E. IVES.
DIFFRACTION COLOR PHOTOGRAPH AND MODE OF MAKING SAME.
APPLICATION FILED OCT. 19, 1905.
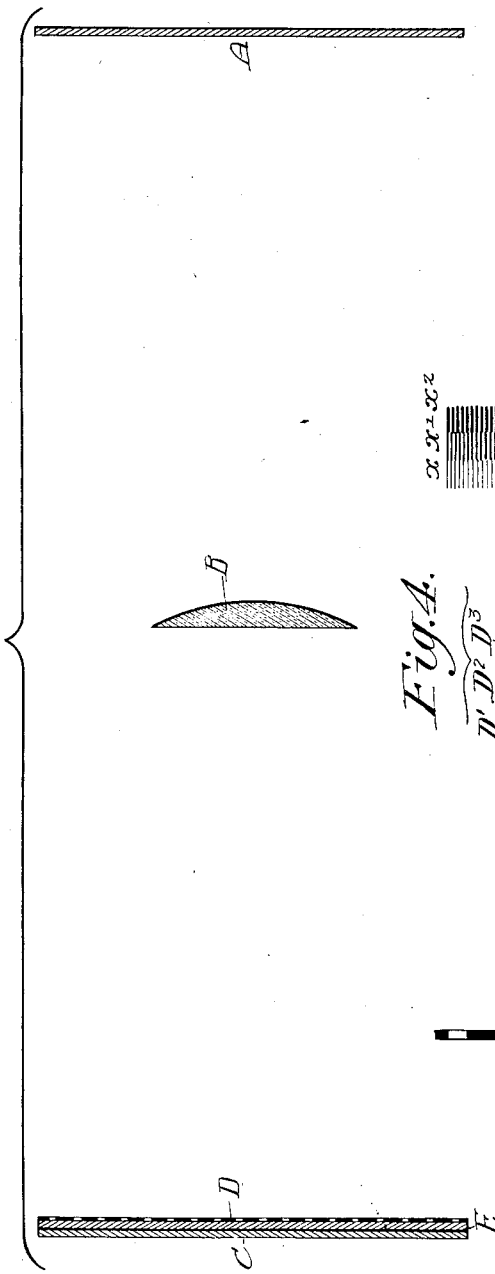
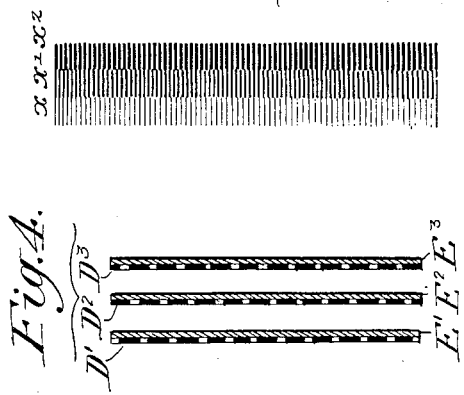
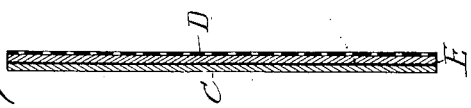
Witnesses:
Titus Helrous.
Augustus B. Coppes
Inventor:
Herbert E. Ives.
by his Attorneys,
Howson Howson

UNITED STATES PATENT OFFICE.

HERBERT E. IVES, OF WOODCLIFFE-ON-THE-HUDSON, NEW JERSEY.

DIFFRACTION COLOR PHOTOGRAPH AND MODE OF MAKING SAME.

No. 817,569.      Specification of Letters Patent.      Patented April 10, 1906.

Application filed October 19, 1905. Serial No. 283,481.

*To all whom it may concern:*

Be it known that I, HERBERT E. IVES, a citizen of the United States, residing in Woodcliffe-on-the-Hudson, New Jersey, have invented certain Improvements in Diffraction Color Photographs and in the Mode of Making Same, of which the following is a specification.

My invention applies to the diffraction process of color photography. In this process the colors of the photograph are due to three superposed or mixed diffraction-grating images, each grating providing by a suitable disposition of viewing apparatus one of the three primary colors. Thus in the ordinary form of viewing apparatus for such pictures a narrow source of light is focused by a lens onto the eye, under which condition the eye observes the whole surface of the lens filled with light. Diffraction-gratings when placed over the lens deviate and disperse portions of the incident light to form spectra to right and left of the central focus. The eye placed at any point in these spectra sees the lens-surface evenly illuminated no longer by white light, but by light of the color incident on the eye. If three gratings of different spacing are used, each grating sends a different color to the eye, and by appropriate spacing the three colors received by the eye from the three gratings will be primary red, green, and blue. If now the three gratings by varying strength of the lines over their surfaces each represent the distribution of one of the primary colors necessary to counterfeit to the eye the form and color of a material object, then on so superposing or mixing them that their combined effect is the sum of their separate effects they appear to the eye as a color photograph. These diffraction color photographs have heretofore been made by either of two different procedures. In both the gratings images are printed on plates of glass flowed with a solution of bichromated gelatin or albumen. In accordance with the first method the three grating-prints are made one on top of the other. A plate is flowed with gelatin, dried, and exposed in contact with a diffraction-grating ruled on glass under a photographic positive, representing by its light and shade the distribution of the color sensation which the grating is designed to send to the eye. The resultant print is a diffraction image varying in strength according to the light and shade of the photographic image. Similar procedures with the other two gratings and their respective positives imprint all three color records on the same gelatin surface. By the second procedure the diffraction picture is made up of alternate strips of each of the three spacings, the ordinary ruled gratings being replaced by one in which the three spacings alternate across the surface, the diffraction-lines being parallel to the direction of the strips. To regulate the distribution of light and shade in printing in contact with this triple grating, a special positive is used with the three-color record made up of alternating juxtaposed lines across its surface, the image being projected on the triple grating so that its lines exactly coincide with the strips of the grating. Both of these methods have serious defects.

In making a picture in accordance with the first procedure it has been found by experience that the gelatin printing-surface is incapable of receiving with complete success three diffraction images, for if two partly-overlapping printings are made from a grating the overlapping portion will frequently be found to be less brilliant than either of the free portions instead of twice as brilliant, as is necessary for the complete success of the process. When, moreover, several diffraction-gratings are superposed, they form together a new grating whose effects are superposed upon those of the original gratings, for if two gratings in which the distance apart of the ruled lines is respectively $a$ and $b$ are superposed a new grating will be formed with the equivalent of a line of double strength whenever the condition $m\ a = n\ b$ ($m$ and $n$ = whole numbers) is fulfilled. These additional coarser gratings produce series of spectra which are always present and mix their effects with those of the original gratings. For example, it has been found that two gratings of two thousand and sixty-two and two thousand eight hundred and eighty-eight lines to the inch, which send, respectively, red and blue light to the same point, form a compound grating which sends green light from its fifth order spectra to the eye at the point where the second order of the original gratings is formed, showing apparently red and blue light mixing to produce green instead of purple. These secondary spectra, always present, vary greatly in strength according to the quality of the original ruling and the conditions of printing. They constitute an element of uncertainty which precludes the possibility of making the production of these pictures an exact process. Both of these defects could be obviated in some degree by making the three printings on three separate plates of glass and superposing them; but this method is open to the objection that the three pictures must be at different distances from the eye, with consequent parallax of vision and lack of exact agreement in position, and the necessity of making three prints to secure a reproduction of an original picture and superposing the three prints (instead of making a single print, as can be done when all three of the grating images are on one surface) is likely to make the products very irregular in quality, and is hence undesirable. It has also been found by experience that no dependence can be placed on the colors obtained when the gratings overlap, even when separated from each other, pointing to the necessity of some method of mixing the effects of the gratings other than by superposition.

The second procedure, before referred to, in which the combination of the effects of the different grating-spacings is provided by having juxtaposed strips of each grating, the effects being combined by the eye, is free from the above defects, but as heretofore carried out has serious defects of its own. In order for this procedure to be successful, the strips of each grating-spacing should be so narrow as to be indistinguishable as strips by the eye. The precedure adopted heretofore makes this impracticable. The ruling of a grating in the first place with alternating lines of three different spacings is a difficult and laborious operation. In using it, when obtained, it is extremely difficult to insure the coincidence of the color record-lines of the positive used with the strips of rulings. Making the strips closer together would increase this difficulty enormously. The slightest error would, for instance, print part of a line of the positive corresponding to one color on a wrong grating-strip by an amount depending on the relative size of the error and the width of the strip. Any slight defect, such as a periodic error, present in either the lines of the positive or the strips of grating and not in both alike would cause a similar defect and the spacing, size, and character of the line positive place restriction on the procedure. The spacing of the positive is dependent on the method used in making it, which may make fine lines impracticable and no reduction of the width of the color record-line of the positive in projecting its image on the bichromated gelatin can be made without a corresponding change, often undesirable, in the size of the picture.

A further objection is that due to having the grating-lines parallel to the direction of the strips. As the strips are made narrower a factor to be reckoned with is the possibility of frequent periodic repetitions of the disposition of grating-lines about the adjoining edges of two strips of grating-spaces, thereby introducing extra diffraction effects. While this may never become a very serious factor, it is an undesirable contingency, and therefore to be avoided.

The object of my invention is to secure the advantages of the method of juxtaposition in contradistinction to the method of superposition, while obviating the defects of the above-described procedure. To do this, I make use of continuous gratings ruled on glass according to the ordinary method of producing diffraction-gratings in conjunction with a screen of alternate transparent and opaque spaces, the opaque spaces being twice the width of the transparent spaces.

In the accompanying drawings, Figure 1 is a diagram illustrative of my improved method of making diffraction color photographs. Fig. 2 is an exaggerated section of a line-screen employed in carrying out said process. Fig. 3 is an exaggerated view of the three elements of a diffraction color photograph made in accord with my invention, and Fig. 4 is a view illustrating a modification of my invention.

In Fig. 1 of the drawings, A represents an ordinary photographic positive, and B a lens, forming an image of the positive on the front surface of a bichromatized gelatin-plate C, which is fixed rigidly in place. D is the screen of transparent and opaque lines, mounted with a micrometer-screw or other device by which it may be moved across the face of the plate C to any desired extent, and E is a continuous diffraction-grating on glass pressed into contact with the gelatin surface of the plate C.

No attempt is made to illustrate proportions, as this is precluded by the limitations imposed upon the draftsman.

If the positive A represents the primary red, the grating E will be one whose spacing is calculated to send red light to the eye in the viewing apparatus. After an exposure has been made the red positive is placed by one representing the primary green, the line-screen D is shifted to the extent of the width of each of its clear spaces, the grating E is replaced by one calculated to send green light to the eye, and a second exposure is made. Similar procedure secures a print corresponding to the blue, the bichromatized gelatin-plate remaining fixed throughout. The positives must of course be arranged so that their images given by the lens B coincide at C.

By my invention it is possible to produce by the use of ordinary diffraction-gratings and from any set of trichromatic photographic positives themselves free from lines diffraction-pictures made up of juxtaposed strips of any desired degree of fineness. It is also possible by this method to have the lines of the line-screen run at any angle to the grating-lines. In practice it is found desirable to have the lines of the line-screen at D run other than parallel, preferably perpendicular, to the lines of the diffraction-grating, so that each photograph will be composed of repetitions of three juxtaposed strips $x, x'$, and $x^2$, Fig. 3, each composed of lines representing the diffraction-ruling proper for the color represented, the lines of the rulings being at right angles to the direction of the strip. One advantage of this is that secondary diffraction effects produced when the separation of the strips is made very small are disposed at a different angle than those from the gratings utilized to send the red, green, and blue desired, and so do not produce disturbance. It is also obvious that the disposition of the strips at right angles to the diffracting-lines places practically no limit upon the width of the strips, which can be made mere rows of points, if desired, since the reduction of width until they are no longer distinguishable by the eye is dependent simply upon the fineness of the line-screen.

It would be possible to use the opaque lined screen in connection with a composite diffraction-grating instead of three continuous gratings, the composite grating having three different spacings of lines disposed in strips, each of the width of the transparent spaces of the line-screen, the latter after each exposure being moved to the extent of the width of one of said spaces, so that on each exposure one of the grating-strips will be exposed and the other two shielded; but aside from the difficulty of making such a composite grating its use necessitates extreme care in order to insure the accurate alinement of the line-screen and composite ruling. It will also be possible to permanently combine with each diffraction-grating a line-screen having its clear spaces disposed with reference to the color represented by said diffraction-grating, three of these composite line and diffraction screens being used in succession, care being taken in each case to properly register the composite diffraction and line screen with the sensitive plate, so as to insure the proper juxtaposition of the successively-formed diffraction line-strips on said plate. Such a series of screens is shown in Fig. 4, $E'$, $E^2$, and $E^3$ representing the three diffraction-gratings and $D'$, $D^2$, and $D^3$ the three line-screens having their clear spaces in different lateral relation.

Having thus described my invention, I claim and desire to secure by Letters Patent—

1. The mode herein described of making a diffraction color photograph, said mode consisting in projecting onto the sensitive surface, through three successive and differently-ruled diffraction-gratings, and three successive and different dispositions of clear spaces in a line-screen device, rays from three successsive images, each representing one of the primary-color sensations, substantially as specified.

2. The mode herein described of producing a diffraction color photograph, said mode consisting in projecting onto the sensitive surface through three successive and differently-ruled diffraction-gratings and three successive and different dispositions of clear spaces of a line-screen device which are disposed at an angle to the diffraction-lines, rays from three successive images, each representing one of the primary-color sensations, substantially as specified.

3. The mode herein described of producing a diffraction color photograph, said mode consisting in projecting onto the sensitive surface, through three successive and differently-ruled diffraction-gratings and a line-screen having opaque spaces twice as wide as its clear spaces, rays from three successive images, each representing one of the primary-color sensations, and shifting the line-screen, between successive exposures to the extent of the width of each of its clear spaces, substantially as specified.

4. The mode herein described of producing a diffraction color photograph, said mode consisting in projecting onto a sensitive surface, through three successive and continuously-ruled but differing diffraction-gratings and three successive and different dispositions of clear spaces of a line-screen device, rays from three successive images, each representing one of the primary-color sensations, substantially as specified.

5. The mode herein described of producing a diffraction color photograph, said mode consisting in projecting onto a sensitive surface, through three successive and continuously-ruled but differing diffraction-gratings, and a line-screen having opaque spaces twice as wide as its clear spaces, rays from three successive images, each representing one of the primary-color sensations, and shifting the line-screen between successive exposures to the extent of the width of each of its clear spaces, substantially as specified.

6. The mode herein described of producing a diffraction color photograph, said mode consisting in projecting onto a sensitive surface, through three successive and continuously-ruled but differing diffraction-gratings and a line-screen having opaque spaces twice as wide as its clear spaces and disposed at an angle to the diffraction-lines, rays from three successive images, each representing one of the primary-color sensations, and shifting the line-screen between successive exposures to the extent of the width of each of its clear spaces, substantially as specified.

7. A diffraction color photograph composed of juxtaposed strips of diffraction-lines, the lines of each strip being spaced differently from those of the other strips, and being disposed at an angle to the direction of the strip, substantially as specified.

In testimony whereof I have signed my name to this specification in the presence of two subscribing witnesses.

HERBERT E. IVES.

Witnesses:
A. J. GRUPE,
CHAS. A. NICHOLSON.